(No Model.) 2 Sheets—Sheet 2.
F. STAHL.
SHINGLE SAWING MACHINE.
No. 316,301. Patented Apr. 21, 1885.
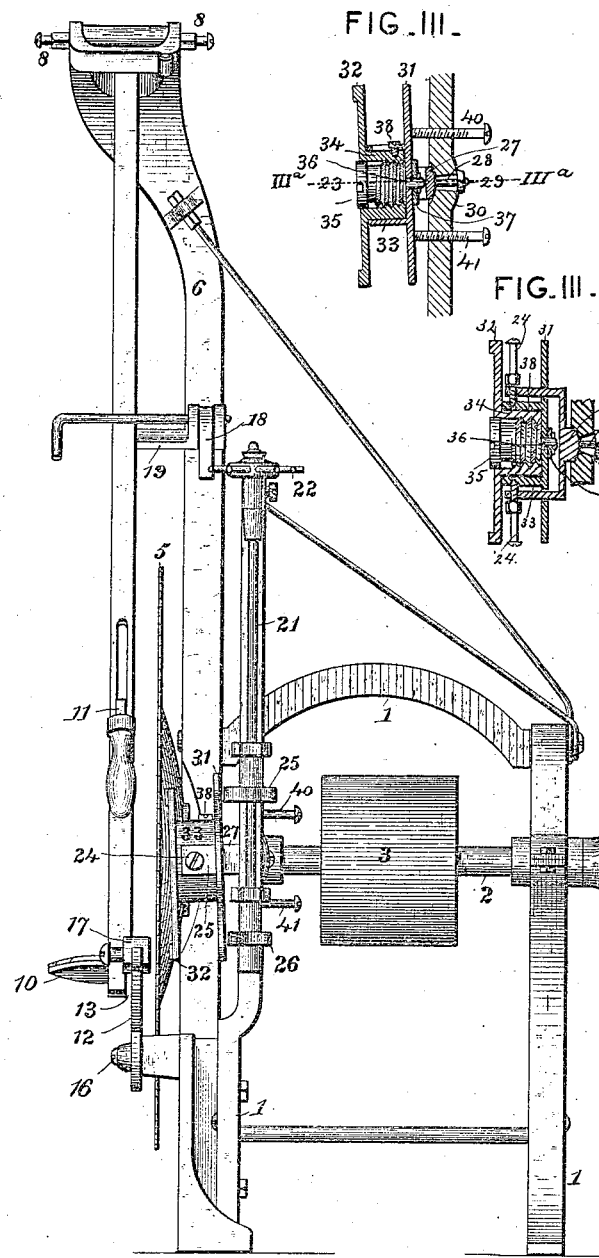
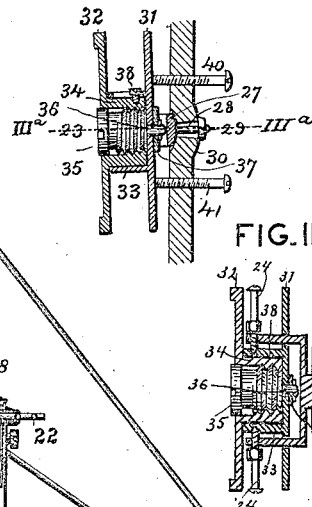
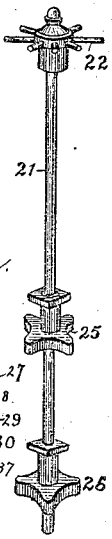
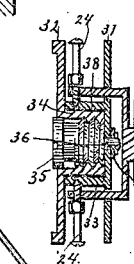
FIG. II.  FIG. III.  FIG. IV.  FIG. III.a
Attest:
Geo. P. Smallwood.
L. M. Hopkins.
Inventor:
Frank Stahl.
By Knight Bros.
attys.

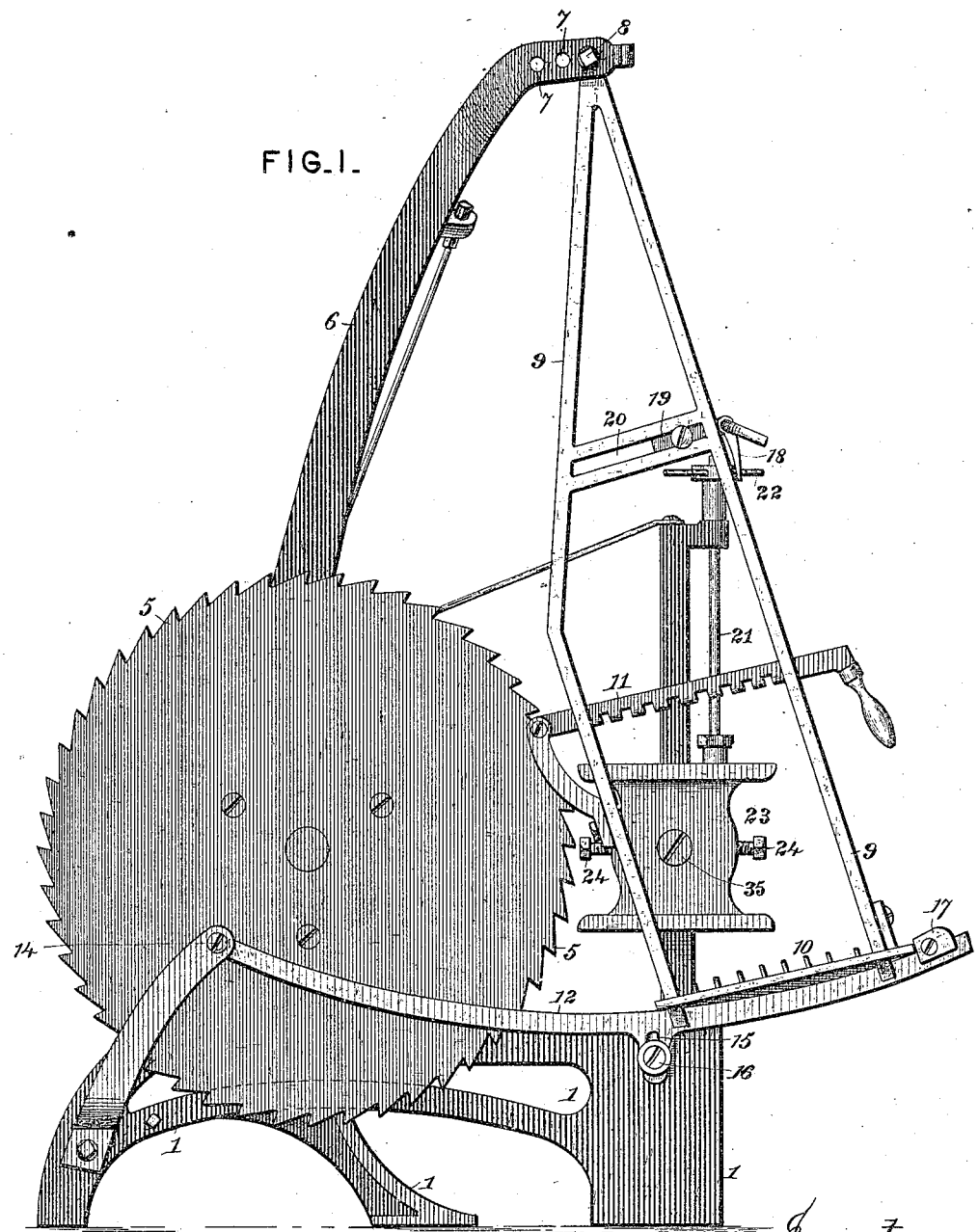

United States Patent Office.

FRANK STAHL, OF CLEVELAND, OHIO.

SHINGLE-SAWING MACHINE.

SPECIFICATION forming part of Letters Patent No. 316,301, dated April 21, 1885.

Application filed January 23, 1885. (No model.)

*To all whom it may concern:*

Be it known that I, FRANK STAHL, a citizen of the United States, residing at Cleveland, in the county of Cuyahoga and State of Ohio, have invented certain new and useful Improvements in Shingle and Heading Machines, of which the following is a specification, reference being had to the accompanying drawings, in which—

Figure I is a side elevation of a machine embodying my invention. Fig. II is an end view of the same. Fig. III is a vertical section of the adjustable gage, showing the means for securing it to the frame of the machine; and Fig. III$^a$ is a horizontal section on the line III$^a$ III$^a$, Fig. III. Fig. IV is a perspective view of the cam-shaft which oscillates the gage, as hereinafter fully described.

1 represents the frame of the machine, which has a shaft, 2, journaled therein, said shaft having a belt-pulley, 3, by which it is rotated, a balance-wheel, 4, and a circular saw, 5, all of which may be of any ordinary or preferred construction.

From the frame 1 rises a standard, 6, having a horizontally-projecting enlarged upper end, which is apertured or formed with an enlarged eye, as shown in Fig. II. The sides of this eye are pierced with a number of holes, 7, through any of which may be passed a pintle or bolt, 8, from which depends the bolt-frame 9. The bolt-frame is provided at bottom with a table, 10, and has also a pivoted lever, 11, which latter, in connection with the table, forms the clamp for holding the bolt.

12 is an arcuate guide, which is embraced by slots or grooves 13, formed in the lower extremities of the bolt-frame 9, and serves to confine the latter to a plane of vibration perfectly parallel with the plane of the saw. This guide is pivoted at its rear extremity, 14, to an arm of the frame 1, and provided with a slot, 15, within which works the shank of a clamp-screw, 16, which is threaded into a fixed part of the frame 1 and serves to hold the guide 12 in any position in which it may be set. It is of course necessary that this guide should be concentric with the center from which the bolt-frame 9 is suspended.

17 is an adjustable stop for limiting the backward movement of the bolt-frame.

18 is a pendulating pawl, which is so mounted as to swing freely in the direction of the arrow.

This pawl is mounted in a block, 19, which is adjustable in a slot, 20, in the frame 9.

21 is a shaft, which is journaled vertically in the frame 1, and provided at top with a number of radial teeth or spokes, 22, one of which is engaged by the pendulating pawl 18 at each backward movement of the bolt-frame, whereby said shaft is partially rotated.

23 is an adjustable gage, which oscillates, in a vertical plane, an adjustable trunnion, 24.

25 and 26 are cam-disks, which are secured to the shaft 21 above and below the center of oscillation of the gage 23, respectively. Each of these cam-disks is provided with four summits, equidistantly arranged, the two disks being secured to the shaft in such a manner relatively to each other that the summits shall alternate, as represented in Fig. IV. The number of summits on the cam-disks may of course be changed at pleasure.

27 is a yoke the extremities of which support the trunnions 24 of the tilting gage 23, said yoke being secured to the frame 1 by a universal joint, as fully represented in Fig. III, where it will be seen that the frame 1 is provided with a sphero-segmental cavity, while the back of the yoke is correspondingly convexed. The frame is apertured at 28 for the passage of a securing-bolt, 29, the head of which bears upon a convex surface, 30, preferably through the intervention of a washer. The bolt 29 has sufficient clearance to permit the universal movement of the gage 23, in order that it may be set in a plane of perfect parallelism with the saw.

The adjustable gage is composed of a back plate, 31, and a face plate, 32. The back plate, 31, is provided with a hollow hub, 33, projecting from its face, while the face plate is provided with a hub, 34, projecting from its back, the latter fitting and sliding within the former, as represented in Fig. III. The face plate 32 is bored centrally through its hub, and has near the extremity of said hub an internal screw-thread, which is engaged by corresponding threads formed on an adjusting-screw, 35. The end of this screw 35 is considerably reduced in size, as shown at 36, and is without threads, being passed through a corresponding eye in the back plate, 31, and receives at its extremity a washer, 37, and a pin or other device by which it is held in place. This single screw, when turned by an ordinary screw-driver, which is applied from the face of the gage, adjusts the face plate relatively to the saw, so as to regulate the depth of cut without disturbing the parallelism of said face plate.

In devices as heretofore constructed, to change the depth of cut required the skillful manipulation of four screws, which screws also constituted the means for maintaining the parallelism of the face of the gage and saw. In my device these adjustments are regulated by separate screws, and hence one may be altered at pleasure without disturbing the other.

38 is a screw, which is threaded into the hub 34, its shank working through a slot, 39, in the hub 33, its office being to prevent the inner hub from turning.

The operation of the machine is as follows: The nut on the bolt 29 is first loosened, and the face of the gage placed in a plane perfectly parallel with that of the saw, and the nut again tightened. When the face of the gage is vertical, the cam-disks 25 26 will occupy the positions shown in Fig. IV, one of the summits on the disk 26 being in contact with the back of the gage, while all of those on the disk 25 are out of engagement. The bolt-frame is retracted and the bolt placed upon the table 10 with its end flush against the face of the gage 23, and then clamped by pressing down on the lever 11. The frame is now moved up to the saw, and a slab is thereby cut off, the cut being a straight one by reason of the gage-face and saw being parallel. The frame is then retracted, and in doing so the pawl 18 comes in contact with one of the spokes 22 and partially rotates the cam-shaft 21. This rotation of the cam-shaft causes the summit of the disk 26 to recede from the back of the gage, while one on the disk 25 is made to engage, thereby tilting the said gage to the position shown in Figs. II and III. The lever 11 is now elevated to free the bolt, and said bolt fed forward until its end is flush against the face of the gage, where it is again clamped and fed forward to the saw. The piece cut off this time will be wedge-shaped. Thus the points and butts are formed.

The vibration of the gage is limited by a pair of set-screws, 40 41, placed, respectively, above and below its center of oscillation.

Having thus described my invention, the following is what I claim as new therein, and desire to secure by Letters Patent:

1. In combination, a main frame, a saw, an oscillating bolt-frame suspended from said main frame, an oscillating gage, a cam-shaft which is partially rotated at each oscillation of the said bolt-frame, and a pair of cam-disks secured to said cam-shaft and having their summits arranged to bear alternately against the oscillating gage on the respective sides of the axis upon which it oscillates, substantially as and for the purpose set forth.

2. The combination, in a shingle-machine, of a main frame, a saw, and an oscillating bolt-frame, with a gage for regulating the insertion of the bolt, secured to said main frame or an arm thereof by a universal joint, as and for the purpose set forth.

3. The combination, with a main frame, a saw, and an oscillating bolt-frame, of an adjustable gage for regulating the insertion of the bolt, consisting of a back plate secured to the frame by a universal joint, a face plate, guides for preventing the rotation of said face plate, and a screw threaded into one member and swiveled to the other, as and for the purpose set forth.

4. In combination, the main frame 1, the gage 23, the trunnions 24, upon which it oscillates, the yoke 27, secured to said main frame 1 and supporting said trunnions, the cam-shaft 21, the cam-disks 25 26, secured to said shaft on the respective opposite sides of the trunnions 24, and the set-screws 40 41, for impinging against the back of the gage and limiting its oscillation, as and for the purpose set forth.

5. The combination, with the main frame 1, the saw 5, and the oscillating bolt-frame 9, suspended from said main frame, of a gage, 23, for limiting the insertion of the bolt, trunnions 24, upon which said gage oscillates, yoke 27, supporting said trunnions and connected to the frame 1 by a universal joint, substantially as and for the purpose set forth.

6. The combination, with the main frame, a saw, and an oscillating bolt-frame, of an adjustable gage for regulating the insertion of the bolt, consisting of a pair of plates, each having a hub projecting from their contiguous faces and one sliding within the other, as described, and an adjusting-screw threaded in one member and swiveled to the other, as and for the purpose set forth.

7. The combination, with a main frame, a saw, and an oscillating bolt-frame, of an adjustable gage for regulating the insertion of the bolt, consisting of a pair of plates, each having a hollow hub projecting from their contiguous faces, one sliding within the other, as described, a screw for moving them to and from each other, and means for preventing their rotation, as set forth.

8. The combination, with a main frame, 1, a saw, 5, and a bolt-frame, 9, of a gage, 23, consisting of the yoke 27, secured to the frame 1, the back plate, 31, oscillating on trunnions 24, supported by said yoke, and having a hollow hub, 33, projecting therefrom, the face plate 32, having the internally-screw-threaded hub 34, sliding within the hub 33 and held against turning therein, as described, and the screw 25, working in the threads of the hub 34 and swiveled to the plate 31, all substantially as and for the purpose set forth.

FRANK STAHL.

Witnesses:
D. M. BECKER,
H. CARTER.